I. E. GLEASON.
FIREPROOF PARTITION.
APPLICATION FILED APR. 25, 1911.
1,134,736.
Patented Apr. 6, 1915.
3 SHEETS—SHEET 1.
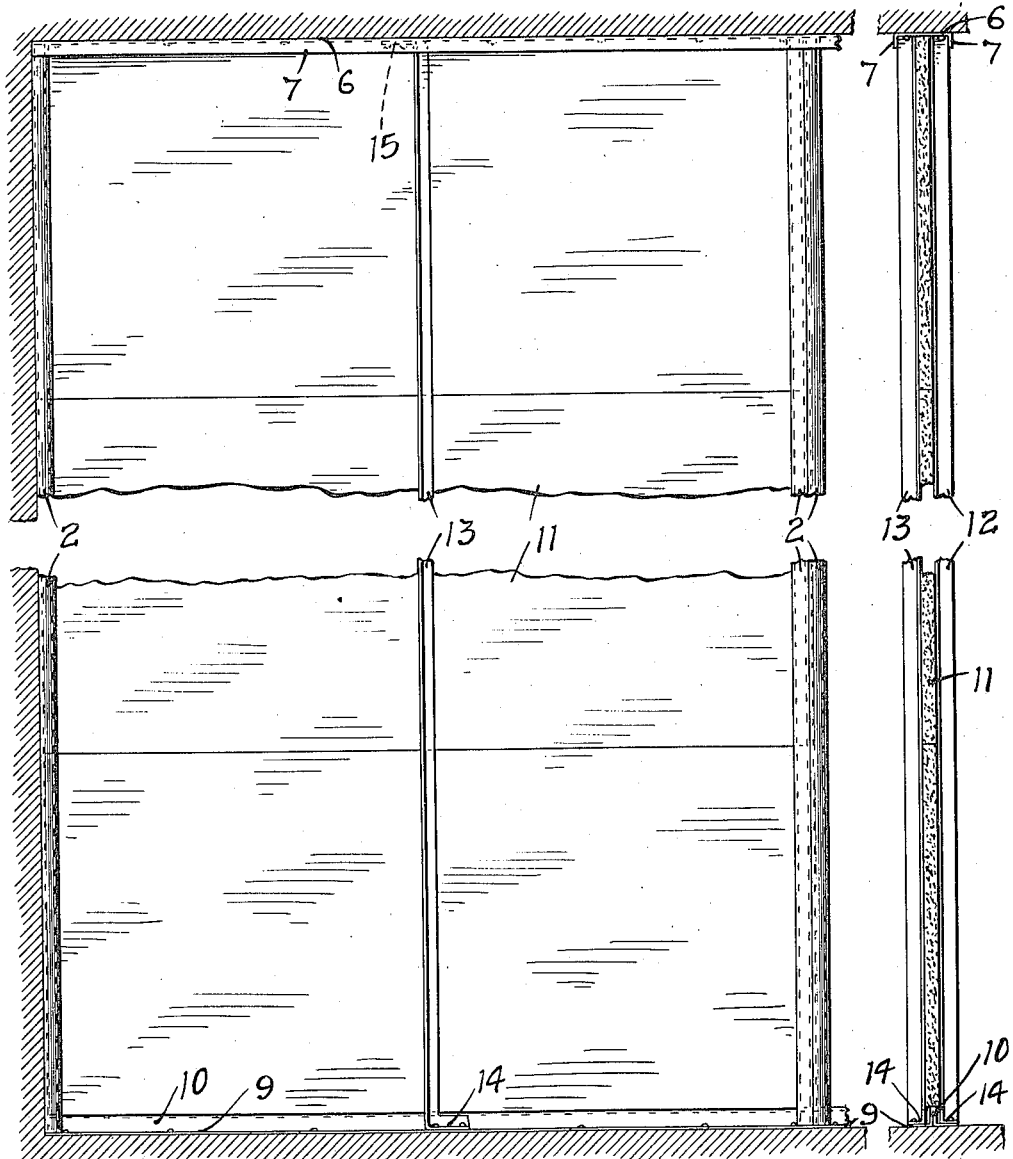
WITNESSES
INVENTOR
ISAAC E. GLEASON
BY
ATTORNEYS I. E. GLEASON.
FIREPROOF PARTITION.
APPLICATION FILED APR. 25, 1911.
1,134,736. Patented Apr. 6, 1915.
3 SHEETS—SHEET 2.
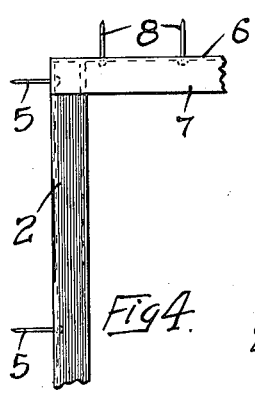
Fig 4.
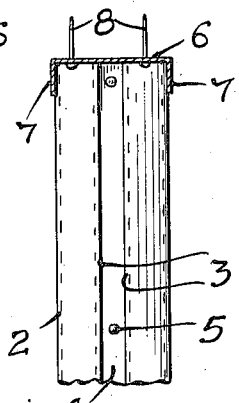
Fig 5.
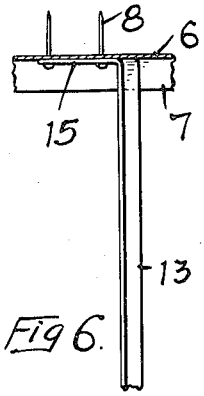
Fig 6.
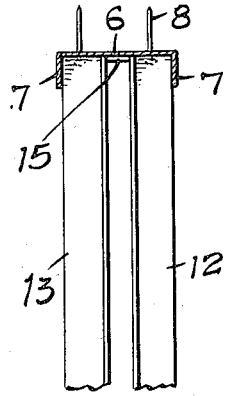
Fig 7.
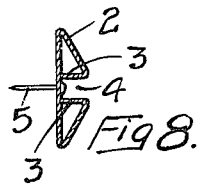
Fig 8.
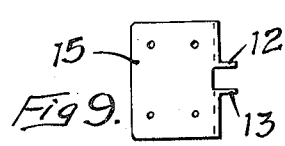
Fig 9.
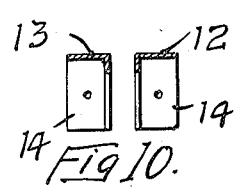
Fig 10.
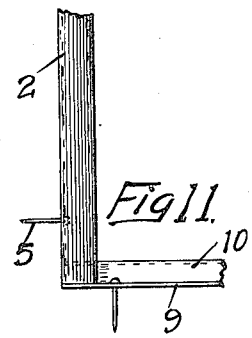
Fig 11.
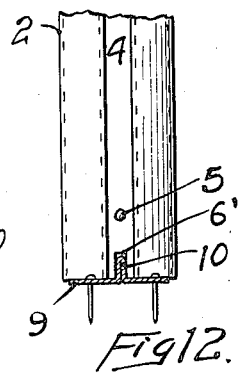
Fig 12.
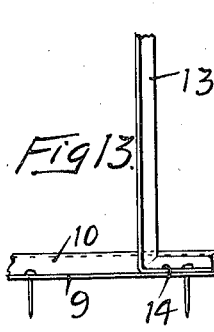
Fig 13.
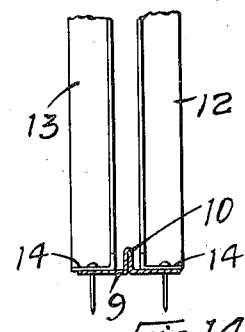
Fig 14.
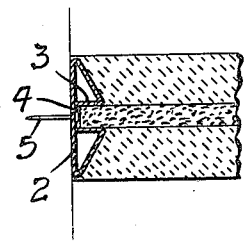
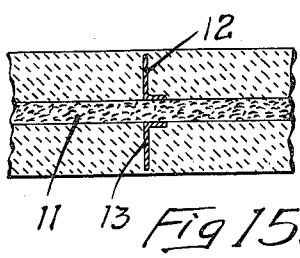
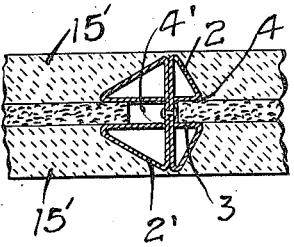
Fig 15.
WITNESSES
INVENTOR
ISAAC E. GLEASON
BY Paul & Paul
ATTORNEYS

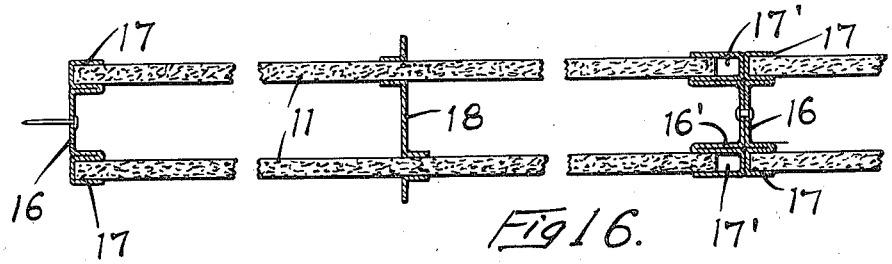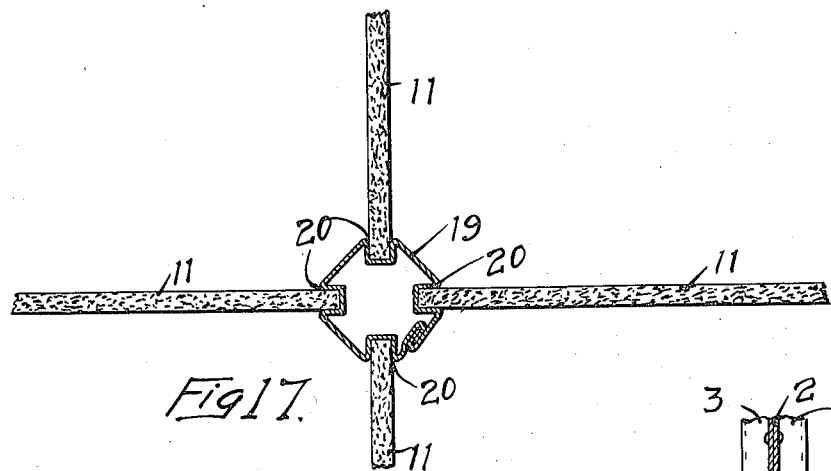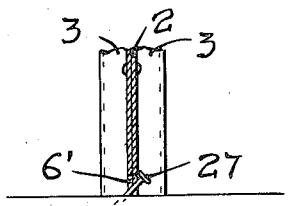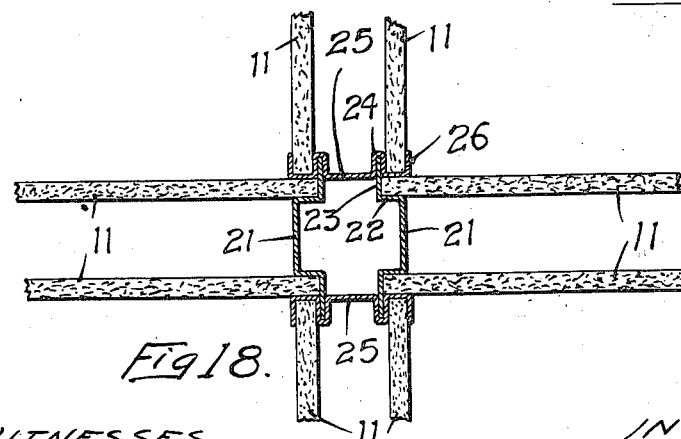

UNITED STATES PATENT OFFICE.

ISAAC E. GLEASON, OF MINNEAPOLIS, MINNESOTA, ASSIGNOR OF ONE-HALF TO FRED W. FARRINGTON, OF MINNEAPOLIS, MINNESOTA.

FIREPROOF PARTITION.

1,134,736.  Specification of Letters Patent.  Patented Apr. 6, 1915.

Application filed April 25, 1911. Serial No. 623,804.

*To all whom it may concern:*

Be it known that I, ISAAC E. GLEASON, of Minneapolis, county of Hennepin, and State of Minnesota, have invented certain new and useful Improvements in Fireproof Partitions, of which the following is a specification.

The object of my invention is to provide a fireproof partition which will be impervious to the passage of sound and can be easily and quickly erected without the use of nails, clips, wire, or other devices usually employed in partitions of this kind.

A further object is to provide a partition which can be set up on the floor of a building to subdivide the space in any desired manner after the erection of the building.

A further object is to provide a partition which will be inexpensive in construction and can be easily and quickly erected.

My invention consists generally in various constructions and combinations, all as hereinafter described and particularly pointed out in the claims.

In the accompanying drawings forming part of this specification, Figure 1 is a side view of a partition embodying my invention, Fig. 2 is a horizontal sectional view of the same, Fig. 3 is a vertical sectional view, Fig. 4 is a detail view illustrating the top plate and the upright post or studding, Fig. 5 is a sectional view of the top plate, showing the groove in the studding, Figs. 6 and 7 are detail sectional views of the intermediate studding, Fig. 8 is a sectional view of the stud at the end of the partition, Figs. 9 and 10 are detail views of the upper portion of the intermediate stud of the partition, Figs. 11 and 12 are detail views showing the manner of securing the studding to the floor plate, Figs. 13 and 14 are similar views, showing the manner of securing the intermediate stud to the floor plate, Fig. 15 is a horizontal sectional view through the completed partition, Fig. 16 is a horizontal sectional view showing a partition with a dead air space between the wall plates, Fig. 17 is a horizontal sectional view showing a post from which a series of single partitions radiate, Fig. 18 is a similar view, showing posts with double partitions, Fig. 19 is a detail sectional view showing a means for securing the upright stud to the floor.

In the drawing, 2 represents a post composed preferably of sheet metal having its longitudinal edges 3 inwardly turned toward the center of the plate and spaced apart to form a vertical groove or recess 4. When this post or stud is set up against a flat vertical wall it is preferably secured thereto at suitable intervals by nails 5, which are driven, preferably, through the center of the plate at the bottom of the vertical grooves. At the top of the post or stud I prefer to provide a horizontal ceiling plate 6, also preferably of sheet metal, in the form of an angle bar having depending flanges 7 on its longitudinal edges and secured to the ceiling of the room by nails 8. (See Fig. 5). A floor plate 9 is also provided, secured to the floor by suitable means, such as the nails heretofore described, and having a centrally arranged longitudinal rib 10. (See Fig. 12). In place of this plate, however, I may provide a floor plate corresponding to the ceiling plate 6.

Fitting within the groove 4 is a plate 11 of fire-proof material. This plate may be built up of plaster Paris and a fibrous material in alternate layers and thereby be sound proof, owing to the interruption of the sound waves contacting with the surface of the plate, or it may be composed of asbestos or any other suitable fire-proof material. This plate will be manufactured of suitable size for convenient handling and in erecting a partition one plate will be placed upon another from bottom to top of the partition and end to end across the partition, the lower edge of the bottom plate resting upon the flange 10 and supported thereby while the upper edge of the top plate is centered in the ceiling plate or channel.

At any suitable point between the post 2 I prefer to provide studding consisting, preferably, of angle plates 12 and 13 which are adapted to straddle the plates 11 and have horizontal extensions 14 at their lower ends through which nails pass into the floor plate and the floor beneath. The upper ends of the studs 12 and 13 are joined together by a plate 15 which lies flat against the under surface of the ceiling plate and is secured thereto by nails or similar means. The studs 12 and 13 operate to stiffen the partition and prevent it from bending or buckling. They also hold the horizontal edges of the partition plates in alinement with one another. They also hold the vertical abutting edges of the plates in alinement with one another. When the end of the partition is reached a stud corresponding to the stud or post 2 is provided, and, as shown in Fig. 2, if the partition comprises more than two vertical panels, two of the grooved studs will be placed back to back and the partition continued the desired length, the grooved studs alternating with the studs 12 and 13 throughout the length of the partition. These studs are preferably made of metal of suitable gage, varying according to the height of the ceiling in the rooms where the partitions are erected, the inwardly turned edges of the studs 2 serving to stiffen these studs and render the partition extremely rigid against lateral pressure. When the partition has been erected, a plaster 15' is applied to the plates 11 on both sides thereof of sufficient thickness to conceal the studding and present a smooth, finished surface on both sides of the partition. When the channel plates are used at the top and bottom of the partition, the flanges thereon will serve as grounds for the plaster and protect the edges or corners thereof.

At the end of the partition I prefer to provide a post 2' having a vertical groove or recess 4' therein that is approximately double the depth of the groove in the other posts. This allows the ends of the plates to be inserted into the groove 4' a sufficient distance to clear the sides of the adjoining post so that the partition plates can be inserted after the posts are set up. (See Fig. 15).

In Fig. 16 I have shown a modified construction which consists in providing a stud 16, preferably formed from sheet metal, having vertical grooves 17 formed by bending the edges of the metal, as shown in said figure, the studding being secured to the wall by nails, as before described. When these studs are used in the partition intermediate to its ends they may be placed back to back and riveted together, and the partition may be continued the desired length, the studding being arranged at suitable intervals, according to the length of the partition plates. In this form of partition the plates will be spaced apart and a stud 16' has preferably grooves 17' which are double the depth of the grooves in the adjoining studs, for the purpose described with reference to Fig. 15. There is also provided in connection with this partition a stud 18 which straddles the partition plates in substantially the same manner as described with reference to Fig. 15.

In Fig. 17 I have shown a stud composed preferably of sheet metal adapted for use where a series of partitions come together or meet. Four partitions are shown in this case, but the stud may be readily adapted for use with three partitions, if preferred. This stud I will designate by reference numeral 19, having vertical grooves 20 therein formed by pressing the metal inwardly at regular intervals, the edges of the metal forming the stud lapping by one another and being secured together preferably by interlocking the vertical edges. This stud is adapted for single partitions or those in which single plates are used.

In Fig. 18 the invention is adapted for a series of meeting partitions having dead air spaces between the wall plates and composed of studding, in this case consisting of plates 21 having shoulders 22 formed thereon, and vertical edges 23 which are adapted to enter loops 24 formed in the plates 25, said loops and vertical flanges 26 forming vertical grooves for the ends of the partition plates, and the ends of the plates 25 and the shoulders 22 forming corresponding grooves or recesses to receive the partition plates, which are arranged at right angles substantially to the partition plates which enter the grooves in the studding plates 25.

In Fig. 19 I have shown an upright stud that is held in place on the floor by means of a nail 27 that is inserted through the slot 6' in the lower end of the stud. This arrangement dispenses with the use of a floor plate and the ceiling plate may be eliminated in a similar manner and the partition erected by the use of the upright posts or studs and the intermediate partition plates without any horizontal securing means between them. In some instances I may prefer to arrange the stud horizontally, as by securing it to the ceiling and having the upper edges of the plates fitting into the groove in the stud, the plaster being applied to both surfaces of the plates in the same manner as described with reference to the partitions, using the horizontal ceiling and floor plates.

In various ways the details of this invention may be modified and still be within the scope of my invention, my object being to provide a fire-proof partition which can be erected easily and quickly and when completed will be sound proof and extremely rigid and durable.

I claim as my invention:—

1. A fire-proof partition comprising upright sheet metal studs having vertical grooves formed therein, a ceiling plate, channel-shaped in cross section, between said studs, a floor plate having a central, longitudinal rib and flanges on each side thereof, partition plates fitting within the grooves in said studs and the channel in said ceiling plate and resting upon the rib of said floor plate, angle bar studs provided at any suitable point between the upright studs and having their ends turned at right angles to their middle portion and secured respectively to the flanges of said floor plate upon opposite sides of the partition plates and to said ceiling plate, and means connecting the upper ends of said angle bar studs with one another across said ceiling plate.

2. A fire-proof partition comprising upright sheet metal studs having vertical grooves formed therein, a ceiling plate, channel-shaped in cross section, between said studs, a floor plate having a central longitudinal rib and flanges on each side thereof, partition plates fitting within the grooves in said studs and the channel in said ceiling plate and resting upon the rib of said floor plate, angle bar studs provided at any suitable point between the upright studs and having their ends turned at right angles to their middle portion and secured respectively to the flanges of said floor plate upon opposite sides of the partition plates and to said ceiling plate.

In witness whereof, I have hereunto set my hand this 18th day of April 1911.

ISAAC E. GLEASON.

Witnesses:
GENEVIEVE E. SORENSEN,
EDWARD A. PAUL.